(12) United States Patent
Tharpe, Jr.

(10) Patent No.: US 9,068,121 B1
(45) Date of Patent: Jun. 30, 2015

(54) SYSTEMS, APPARATUS AND METHODS FOR OPTIMIZING THE PYROLYSIS OF BIOMASS USING THERMAL EXPANSION

(71) Applicant: Johnny Marion Tharpe, Jr., Albany, GA (US)

(72) Inventor: Johnny Marion Tharpe, Jr., Albany, GA (US)

( * ) Notice: Subject to any disclaimer, the term of this patent is extended or adjusted under 35 U.S.C. 154(b) by 121 days.

(21) Appl. No.: 13/799,852

(22) Filed: Mar. 13, 2013

(51) Int. Cl.
*C07C 4/00* (2006.01)
*C10B 51/00* (2006.01)

(52) U.S. Cl.
CPC ...................................... *C10B 51/00* (2013.01)

(58) Field of Classification Search
CPC ...................................... C10B 51/00
USPC .......................................... 585/240
See application file for complete search history.

(56) References Cited

U.S. PATENT DOCUMENTS

| | | | |
|---|---|---|---|
| 4,326,382 A | | 4/1982 | Baardson |
| 4,364,745 A | * | 12/1982 | Weil ................................ 48/209 |
| 4,414,813 A | | 11/1983 | Knapp |
| 4,431,405 A | | 2/1984 | Eatherton |
| 4,578,176 A | * | 3/1986 | Tarman ........................ 208/409 |
| 4,638,629 A | | 1/1987 | Archer et al. |
| 5,341,637 A | | 8/1994 | Hamrick |
| 5,471,937 A | | 12/1995 | Kosky et al. |
| 5,513,444 A | | 5/1996 | Lindberg |
| 5,626,638 A | | 5/1997 | Valkanas |
| 5,666,890 A | | 9/1997 | Craig |
| 7,272,934 B2 | | 9/2007 | Chandran et al. |
| 8,206,471 B1 | | 6/2012 | Tharpe, Jr. |
| 8,314,275 B2 | | 11/2012 | Brandvold |
| 8,353,973 B2 | | 1/2013 | Tharpe, Jr. |
| 2004/0020207 A1 | | 2/2004 | Thiessen |
| 2006/0000701 A1 | | 1/2006 | Smith et al. |
| 2006/0101663 A1 | | 5/2006 | Perin et al. |
| 2006/0225424 A1 | | 10/2006 | Elliott et al. |
| 2006/0254081 A1 | | 11/2006 | Carin et al. |
| 2009/0139851 A1 | | 6/2009 | Freel |

FOREIGN PATENT DOCUMENTS

| | | |
|---|---|---|
| CA | 2441692 | 3/2005 |
| DE | 4342165 | 5/1995 |
| DE | 19729585 | 10/1998 |
| EP | 0165839 | 12/1985 |

(Continued)

OTHER PUBLICATIONS

Shaddix et al., for Sandia National Laboratories, Combustion Properties of Biomass Flash Pyrolysis Oils: Final Project Report, Sandia Report, Apr. 1999, Albuquerque, New Mexico 87185 and Livermore, California 94550.

(Continued)

*Primary Examiner* — Cephia D Toomer
(74) *Attorney, Agent, or Firm* — Allen Dyer Doppelt Milbrath & Gilchrist (57) ABSTRACT

A process for pyrolyzing biomass comprises pyrolyzing cellulosic biomass in a fast pyrolysis chamber by heating the cellulosic biomass to a pyrolyzation temperature to generate a pyrolysis vapor flow therefrom. The pyrolysis vapor flow is directed from the fast pyrolysis chamber along a vapor flow conduit to a condensation trap at a temperature sufficient to condense the vapor to liquid and generate a thermal gradient along the vapor flow conduit between the pyrolysis chamber and condensation trap. A majority of the pyrolysis vapor flow along the vapor flow conduit to the condensation trap is achieved by natural convection. Systems that can practice this process are also disclosed.

8 Claims, 6 Drawing Sheets

(56) References Cited

FOREIGN PATENT DOCUMENTS

| JP | 849822 | 2/1996 |
| WO | 2007113330 | 10/2007 |

OTHER PUBLICATIONS

Jones et al. for the U.S. Department of Energy, Production of Gasoline and Diesel from Biomass via Fast Pyrolysis, Hydrotreating and Hydrocracking: A Design Case, Feb. 1999.

Jamil et al, Production of Pyrolytic Oil from Maize Stalk, International Journal of Chemical and Environmental Engineering, Apr. 2011, vol. 2, No. 2.

Ricco et al,, Sprays of Biomass Pyrolysis Oil Emulsions: Modelling and Experimental Investigation, Preliminary Results on Modelling, Italy.

* cited by examiner

Fig. 7

SYSTEMS, APPARATUS AND METHODS FOR OPTIMIZING THE PYROLYSIS OF BIOMASS USING THERMAL EXPANSION

FIELD OF THE INVENTION

The invention relates to the field of pyrolysis and, more particularly, to more efficient systems and processes for pyrolysis of biomass.

BACKGROUND

The United States faces substantial environmental issues from continuing reliance on existing energy sources. The burning of fossil fuels, such as coal and natural gas, results in the emission of excessive amounts of carbon dioxide into the atmosphere. The use of nuclear power raises the specter of ecological damage through the accidental release of radiation into the environment, as well as difficulties in safely disposing of spent nuclear fuel. Hydroelectric projects can disrupt local ecosystems, resulting in major reductions in fish populations, negative impacts on native and migratory birds and damage to river systems.

In recent years, biomass has gained popularity as an environmentally-sound alternative renewable energy source. Biomass, or the fuel products derived from it, can be burned to produce power. Unlike fossil fuels, however, carbon dioxide released from the burning of biomass does not contribute to the overall carbon dioxide content of the atmosphere. This is true because biomass is part of the world's atmospheric carbon cycle. For this reason, biomass is viewed as a renewable, carbon-neutral fuel.

Processing facilities for forest products, used automotive tires, and used railroad cross ties are substantial sources of biomass. The typical forest products facility uses some of its biomass in processing, while the remainder of the biomass is seen as a byproduct. One type of forest products processor that produces a large volume of biomass byproduct is a chip mill that processes small-sized timber. In the chip mill, logs are debarked and then ground into chips for transporting to other mills for further processing. Another type of sawmill is a chip and saw facility ("CNS facility"). A CNS facility produces dimensional lumber from timber that has a diameter ranging from mid-sized to small. Substantial sources of biomass are also available from other forest products facilities, such as large log processing plants, plywood plants, and oriented strand board (OSB) plants, among others.

A typical CNS facility generates an average of more than five-hundred tons of dry biomass byproducts per day. (According to Marks Mechanical Engineering Handbook, the standard for "dry" is defined as twelve percent moisture content or less.) These biomass byproducts typically include white chips, bark, sawdust, and/or wood shavings. The white chips produced by a CNS facility are generally sold to paper-producing mills for processing into paper and cellulose products. The bark, sawdust and shavings are either used at the CNS facility itself as a thermal energy source or sold as a byproduct. Pellet mills have begun to use the white chips and small logs for manufacturing pellets of high density biomass for use a fuel in combustion burner systems. The byproducts of lumber production facilities such as sawdust, planer mill shavings, and bark are not usable for paper production or for pellet production.

Pyrolysis is one process used to produce energy products from biomass. Pyrolysis utilizes temperatures of between about 450-600 degrees Celsius to rapidly heat biomass in the absence of oxygen. The process results in the creation of three products: bio-oil (pyrolysis oil), char, and non-condensing gases. All three products are combustible. Pyrolysis of biomass produces pressure that limits the size and processing capacity of the unit.

Fuel needed to create and maintain such high temperatures in systems utilizing pyrolysis can represent a major operational expense. For this reason, it is desirable to employ systems that make the most of the heat produced. There are a number of strategies for accomplishing this.

One strategy employs techniques meant to optimize the transfer of thermal energy to individual particles of biomass within a pyrolysis chamber. This can be accomplished through the use of organic heat carriers such as hot char and inorganic heat carriers, such as sand. These particularized heat carriers circulate within the pyrolysis chamber and radiate heat to the biomass. Other techniques involve rapidly moving particles of feedstock within a pyrolysis chamber so as to force the particles into nearly continual contact with the hot walls of the chamber. Still other techniques circulate a heated gas stream through a pyrolysis chamber to transfer heat to the particles of biomass. Another strategy involves capturing the hot exhaust resulting from pyrolytic reactions in the pyrolysis chamber and re-circulating that hot exhaust to other parts of the system. Yet another strategy involves insulating the pyrolysis chamber to deter heat loss through the walls of the chamber.

What is needed are pyrolysis systems and methods that improve upon the conservation and re-use of existing heat while being able to produce pyrolysis oil at lower pressures than conventional systems. Also needed are pyrolysis systems and methods that are easily collocated with biomass generating facilities.

SUMMARY

In view of the foregoing background, an advantageous aspect of the invention is a process for pyrolyzing biomass that involves pyrolyzing biomass in a pyrolysis chamber by heating the biomass to a pyrolyzation temperature to generate a pyrolysis vapor flow therefrom. The pyrolysis vapor flow is directed from the pyrolysis chamber along a vapor flow conduit to a condensation trap at a temperature sufficient to condense the vapor to liquid and generate a thermal gradient along the vapor flow conduit between the pyrolysis chamber and condensation trap. In this method aspect, a majority of the pyrolysis vapor flow along the vapor flow conduit to the condensation trap is achieved by natural convection. Several pyrolysis systems capable of performing this method are also described.

In a first system aspect of the invention, a pyrolysis system includes a vertically oriented pyrolysis unit having a pyrolysis chamber elongated along a vertical axis thereof and a combustion chamber arranged generally concentrically and sharing a common heat-conducting wall with the pyrolysis chamber. A combustion source is in thermal communication with a lower end of the combustion chamber for heating the pyrolysis chamber. A biomass input port is proximate an upper end of the pyrolysis chamber for allowing biomass introduced therein to fall towards a lower end of the pyrolysis chamber. A pyrolysis liquid collection unit is in vapor communication with the pyrolysis chamber for condensing the pyrolysis vapor to liquid.

In a second system aspect of the invention, a pyrolysis system includes a biomass input port at a proximal end of an auger housing for feeding biomass into an auger housing chamber. An auger is coupled to the biomass input port for receiving biomass therefrom and moving the biomass along a length of the auger into a pyrolysis zone of the auger housing positioned between the proximal end and a distal end. The auger has a spiral blade positioned along its length. A heat source is coupled to the auger housing and is positioned proximate the pyrolysis zone for providing sufficient heat to pyrolyze biomass in the pyrolysis zone. A char output port is positioned at the distal end for removing char produced during pyrolysis from the auger. A pyrolysis liquid collection unit is in vapor communication with the auger for condensing the pyrolysis vapor to liquid.

In a third system aspect of the invention, a pyrolysis system includes a biomass input port positioned about a proximal end of an inertia conveyor housing for feeding biomass into an inertia conveyor housing chamber. An inclined inertia conveyor is coupled to the biomass input port and extends within the inertia conveyor housing for moving the biomass along a length of the inclined inertia conveyor to a pyrolysis zone positioned between the proximal end and a distal end of the inertia conveyor housing. A heat source is coupled to the inertia conveyor housing and is positioned proximate the pyrolysis zone for providing sufficient heat to pyrolyze biomass in the pyrolysis zone. A char output port is positioned proximate the distal end for removing char produced during pyrolysis from the inertia conveyor. A pyrolysis liquid collection unit is in vapor communication with the inertia conveyor for condensing the pyrolysis vapor to liquid.

These aspects of the invention, along with other additional aspects, embodiments, and features will be better understood by referring to the accompanying drawings and the Detailed Description of Preferred Embodiments.

DETAILED DESCRIPTION

In the Summary above and in the Detailed Description of Preferred Embodiments, reference is made to particular features (including method steps) of the invention. Where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other ingredients, features, steps, etc. are optionally present. When reference is made herein to a process comprising two or more defined steps, the steps can be carried in any order or simultaneously (except where the context excludes that possibility), and the process can include one or more steps which are carried out before any of the defined steps, between two of the defined steps, or after all of the defined steps (except where the context excludes that possibility).

In this section, the invention will be described more fully with reference to certain preferred embodiments. This invention may, however, be embodied in many different forms and should not be construed as limited to the embodiments set forth herein. Rather, these embodiments are provided so that this disclosure will convey preferred embodiments of the invention to those skilled in the art.

The present invention is directed to systems and processes utilizing pyrolysis to produce useful products in a facile manner. It is preferred, although not critical, that the systems be collocated with a facility such as a sawmill that generates biomass as a by-product, and where the exhaust from the pyrolysis process can be used to increase efficiency. To achieve these and other objectives, an aspect of the invention is a compact and portable system that employs a pyrolysis unit capable of capturing and reusing heat that might otherwise be lost to the outside environment. Several system embodiments of the invention that achieve these objectives are discussed herein.

In one embodiment, a batch pyrolysis system utilizes the pressure generated by the pyrolysis vapors to move the pyrolysis vapors and non condensing gas to a separation point. The batch pyrolysis unit provides the ability of processing bulky items without the need for sized reduction while also accommodating biomass that is small in size such as sawdust.

A continuously operable pyrolysis system embodiment also utilizes the pressure generated during pyrolysis to move the pyrolysis vapors and non condensing gas to a separation point.

In some embodiments of the pyrolysis system, a closed loop heat exchanger includes an auger for biomass movement where a section of the auger housing is maintained at a temperature sufficient to transfer thermal energy by radiation and conduction into the biomass for pyrolysis. In a first example, a pyrolysis unit embodying such features includes an elongated, tubular auger pyrolysis chamber and a combustion chamber. The pyrolysis unit is configured generally concentrically so that the combustion chamber is located substantially around the smaller diameter pyrolysis chamber. A heat source is used to produce the heated gas stream flowing through the combustion chamber. In some embodiments, the combustion chamber receives fuel and air that is ignited to produce the thermal energy by combustion. The hot combustion gases flow about the pyrolysis auger housing conductively transferring thermal energy through the auger housing into the biomass to effect pyrolysis of the biomass being moved by the auger. Alternate embodiments use other heat sources, such as a gas turbine or other form of internal combustion engine in conjunction with a burn enclosure where additional fuel is added to reach the desired temperature. Biomass is introduced into the pyrolysis unit and pyrolyzed by conductive and radiant heat transfer through the auger housing resulting in the creation of non-condensing gases (NCG), pyrolysis vapor, along with carbon (char).

Fast pyrolysis occurs when the biomass is heated to the pyrolysis temperature in about two seconds or less. Pyrolysis of cellulosic biomass typically produces 14% NCG (7% Carbon Dioxide & 7% Carbon Monoxide); 14.3% Carbon; and 79.8% pyrolysis vapor per unit mass of the biomass.

When pyrolysis occurs in a fixed volume, the pyrolysis vapor increases the pressure inside the pyrolysis chamber.

One of the advantages of the invention is that, this pressure is utilized to facilitate the flow of the NCG and pyrolysis vapor from the pyrolysis chamber to an associated liquid collection unit where the gases are cooled, the liquid pyrolysis oil is separated from the NCG, and collected as a product of the pyrolysis unit. This principle of operation is significantly different than conventional systems that use a mechanical means such as a pump or fan to generate a forced gas flow that moves the pyrolysis vapor from the pyrolysis chamber to the liquid collection unit. In contrast to these conventional systems, in the systems and processes of the invention, a majority of the pyrolysis vapor flow between the pyrolysis chamber and liquid collection unit is achieved by the natural increase in pressure of the vapors with increase in temperature of the vapors. Preferably, the pyrolysis vapor flow to the liquid collection unit is even achieved without mechanical means for forcing it thereto.

In some embodiments, the gases are directed to fuel usage equipment such as a burner for generation of thermal energy or an internal combustion engine (ICE) for generation of mechanical and/or electrical power. Such internal combustion engine can be a spark ignition, compression ignition, or turbine engine.

The thermal energy source is typically a fuel air combustion burner, but in some embodiments, an electric induction or resistive thermal source is used to supply the thermal energy.

In some embodiments a biomass feed bin is used for introduction of biomass into the pyrolysis unit. In some embodiments, NOG separated from the pyrolysis vapor and char is passed through the biomass feed bin whereupon the biomass acts as a filter, cleaning entrained matter from the exhaust.

In some embodiments char produced by the pyrolysis process is collected as a product of the process.

In yet another embodiment, the exhaust from an ICE is used as a heat source to promote efficient pyrolysis while also producing mechanical and/or electrical power.

In some embodiments a hot gas filter (HGF) system and method is incorporated for removing entrained char from the pyrolysis vapors and NCG prior to cooling and condensing of the pyrolysis vapors into pyrolysis oil. The HGF may include an apparatus and method for cleaning the HGF elements in place during operation of the pyrolysis system. The HGF system addresses a problem of char entraining with the NCG and pyrolysis vapors that flow from the pyrolysis auger housing. It is known that oil produced via pyrolysis that contains char is not desired, as the char continues to react with the pyrolysis oil forming longer chain molecules and a general increase in the viscosity of the pyrolysis oil. Removing the char particles above 2 to 3 microns reduces these degrading effects and provides oil with an extended shelf life. Removal of the char is accomplished prior to condensing of the pyrolysis vapors into pyrolysis oil. Specifically, the char is preferably filtered using a hot gas filter. A unique hot gas filter has been developed and is integrated with a cyclone separator as an exit filter that is economical to fabricate and operate. It is also noted that integration of the cyclone and the HGF system reduces the number of and space required for those machine centers. Ensuring that the char is filtered at the required temperature the outer walls of the cyclone are insulated. Hot gas filters experience build up of the filtered material on the surface of the filter elements referred to as a cake. This build up of material has the positive effect of decreasing the size of the particle that is allowed to pass thru the filter element but the negative result of increasing the pressure required for the gas to flow. This increase in pressure is reflected throughout the pyrolysis unit increasing the power to operate the unit and the pressure capabilities of the unit. As the pressure increases a point is reached where the filter elements must be cleaned or replaced. The filter industry relies on a procedure of back flow of a compatible gas through the filter elements to crack or fracture the cake causing it to fall from the filter element. This procedure is incompatible with the pyrolysis system potentially introducing pressure and thermal shock waves; furthermore the back flow technique does completely clean the filter elements of the cake. The partial cleaning results in a shorter run time between the back flow cleaning cycles reducing the production rate of the pyrolysis system. As the run time becomes too short the filter elements must be removed for cleaning or replacement. A significant aspect of this invention is apparatus and methods for cleaning the filter elements while installed to provide complete removal of the char, returning the elements to a clean condition. Upon reaching a certain pressure drop across the filter elements, the biomass feed to the pyrolysis unit is stopped. Oxygen is supplied to the entrance of the cyclone HGF system. This oxygen rich gas stream causes the char caked on the filter elements to ignite and burn, forming carbon dioxide which flows through the filter elements and into the exhaust system. The cleaning combustion air flow is controlled to prevent overheating of the filter elements and system. The pyrolysis unit is returned to the pyrolysis operation when the cleaning cycle is completed.

Pyrolysis oil forms submicron particles or mist during condensing with the individual droplets having no coalescing affinity. The mist represents a loss in pyrolysis oil production and a potential environmental problem for the system exhaust gas. In some embodiments the NCG and pyrolysis flow through a quench system where they are cooled below the condensation temperature of the pyrolysis forming pyrolysis oil. Following the quench system, the NCG may be drawn into the combustion system for recovery of the carbon monoxide as fuel. The results of the combustion process are exhausted to the atmosphere. In another embodiment, the exhaust gas exiting the combustion system passes through a heat exchanger to recover thermal energy.

Figure 1:
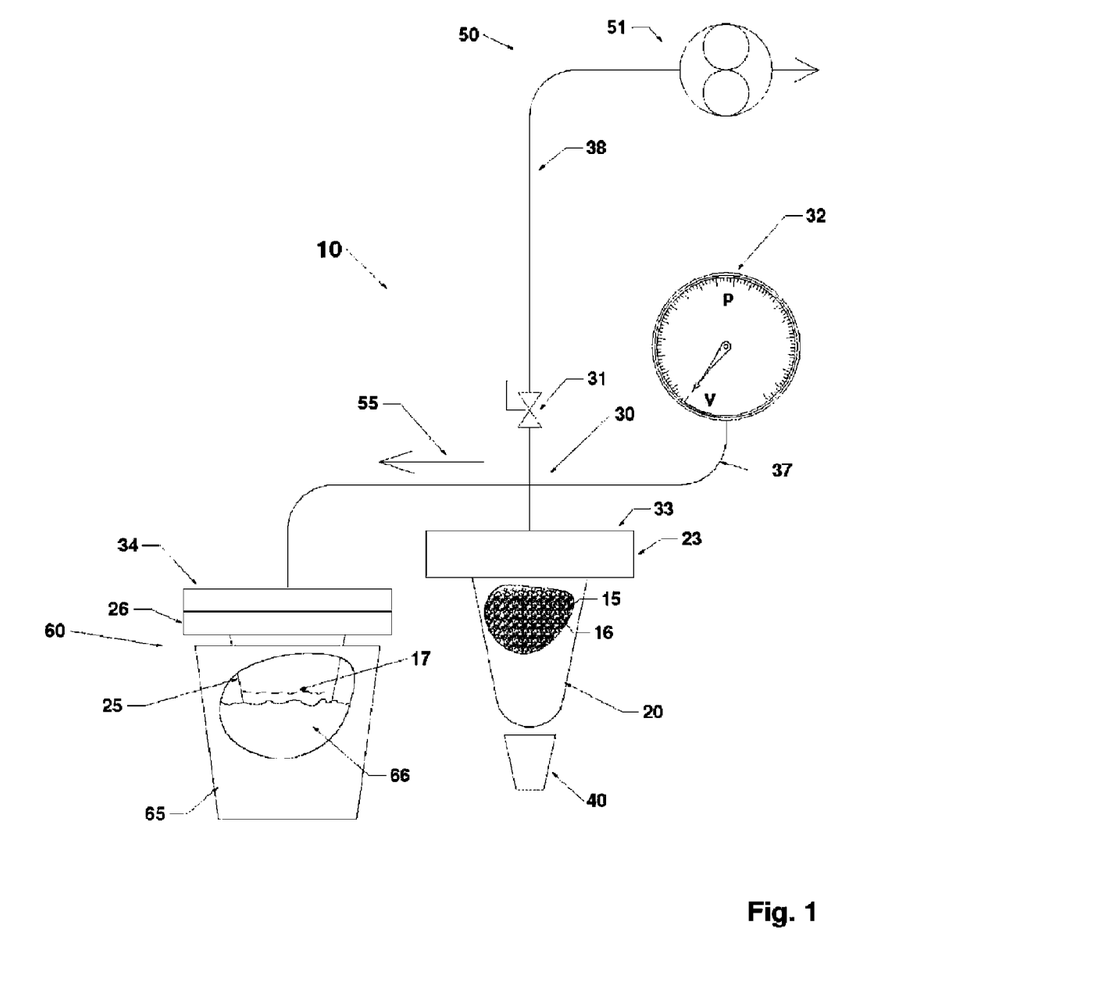
FIG. 1 is a schematic, partially in cross-section, of a first embodiment of a batch pyrolysis system in accordance with an embodiment of the invention.

Referring now to FIG. 1, the pyrolysis system 10 includes a container 20; an interconnecting system 30; a heat source 40; a vacuum system 50; and a liquid collection system 60.

Container 20 contains the biomass 15 prior to pyrolysis and the resulting char 16 following pyrolysis. Container 20 is removably connected to the interconnecting system 30 by flanges 23 and 33.

The interconnection system 30 is connected to the container 20 though flanges 23 and 33; to the liquid cooling system 60 through flanges 26 and 34; and to the vacuum system 50 thought isolation valve 31. A gauge 32 is optionally installed such that it is capable of displaying the pressure or vacuum in the interconnecting system 30.

Interconnecting system 30 provides a flow path through a vapor flow conduit 37, such as mechanical tubing isolation valve 31 to vacuum system 50 when isolation valve 31 is open.

Interconnecting system 30 provides a flow path though the vapor flow conduit 37 between the container 20 and the liquid collection system 60, when the isolation valve 31 is closed.

A heat source 40 is thermally linked to the container 20 for providing thermal energy for pyrolysis of the biomass 15. There are many different types of heat sources 40 that are suitable, which include, but are not limited to, combustion heat sources or electrical heat sources.

Vacuum system 50 includes a vacuum pump 51 and tubing 38. Vacuum pump 51 is connected to isolation valve 31 via mechanical tubing 38.

The liquid collection system 60 includes a container 25 for the liquid 17 following the pyrolysis batch. Container 25 is removably connected to the interconnecting system 30 by flanges 26 and 34.

The liquid collection system 60 includes a unit housing 65 in which a coolant 66 is located. The coolant 66 is a material or system that is capable of cooling the pyrolysis vapors as presented to the liquid collection system 60. Examples of coolants include, but are not limited to chilled water or other liquids.

Each pyrolysis batch begins with bio mass 15 being placed into container 20 which is then connected to the pyrolysis system 10.

Isolation valve 31 is opened and vacuum pump 51 is enabled to remove air from the pyrolysis system 10 by pulling a vacuum as displayed by the gauge 32. Upon completion of establishing a vacuum; the Isolation valve 31 is closed; the vacuum pump 51 stopped; and the thermal system 40 engaged.

Thermal energy is rapidly introduced by the thermal system 40 to effect pyrolysis of the biomass 15 contained in the biomass container 20. As the biomass undergoes pyrolysis the system pressure 90, not shown, will increase. The increase in pressure will be common to the vapor flow conduit 37. The liquid collection system 60 is in pressure communication to the container 20 via the vapor flow conduit 37 but is thermally isolated from the thermal energy system 40. The vapors produced by the pyrolysis will move into the liquid collection container 25 by a thermo siphon flow 55 (shown as an arrow) where they will be condensed into liquid 17. Thermo siphon flow refers to a heat transport mechanism in which the vapor flow is not generated by an external pump, fan, blower, or suction device; instead the flow is generated by the pressure differences in the vapor that occur due to a temperature gradient. The vapors in container 20 receive heat increasing in temperature and pressure while the vapors in container 25 are cooled decreasing in temperature and pressure. The thermo siphon flow is a result of the differential pressure between the container 20 and container 25.

After completion of the pyrolysis batch, the heat source 40 is removed and the system allowed to cool. After cooling, both containers 20 and 25 are disconnected. The carbon 16 is removed from container 20. The pyrolysis liquid 17 is removed from container 25. The emptied containers 20 and 25 are cleaned in preparation of the next batch pyrolysis cycle.

Figure 2:
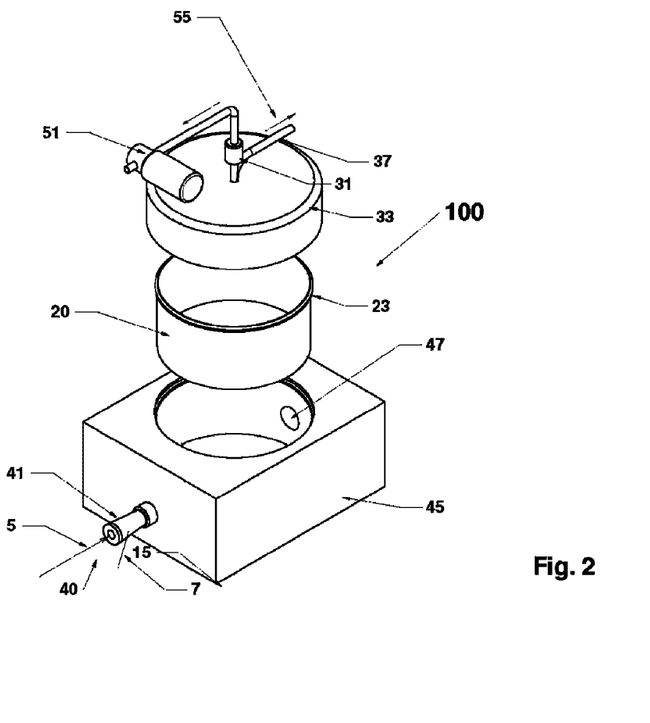
FIG. 2 is a perspective view a pyrolysis unit and heat source useful with pyrolysis system embodiments of the invention.

Referring to FIG. 2 an example of a pyrolysis unit 100 and heat source 40 suitable for use with the pyrolysis system 10 is depicted. Container 20 is filled with biomass 15 and is placed into thermal housing 45 of the heat source 40. A removable top 33 is placed above the container 20 with the sealing ring 23 sealing the container 20 to the removable top 33 and the thermal housing 45 thus forming a closed heat exchanger.

Isolation valve 31 is opened and vacuum pump 51 enabled to draw a vacuum in the batch pyrolysis unit 100. Upon completion of establishing a vacuum; the isolation valve 31 is closed; the vacuum pump 51 stopped; and the heat source 40 engaged.

Thermal energy is rapidly introduced by the heat source 40 to pyrolysis the biomass 15 contained in the biomass container 20. The heat source 40 includes a fuel 7 that is mixed with air 5 and ignited to produce thermal energy by burner 41.

As the biomass undergoes pyrolysis the vapors produced will move into the liquid collection container 25 by thermo siphon flow 55, where they will be condensed into pyrolysis liquid 17.

Following completion of the batch pyrolysis the removable top 33 is removed from the container 20 to allow removal of the carbon 16.

Figure 3:
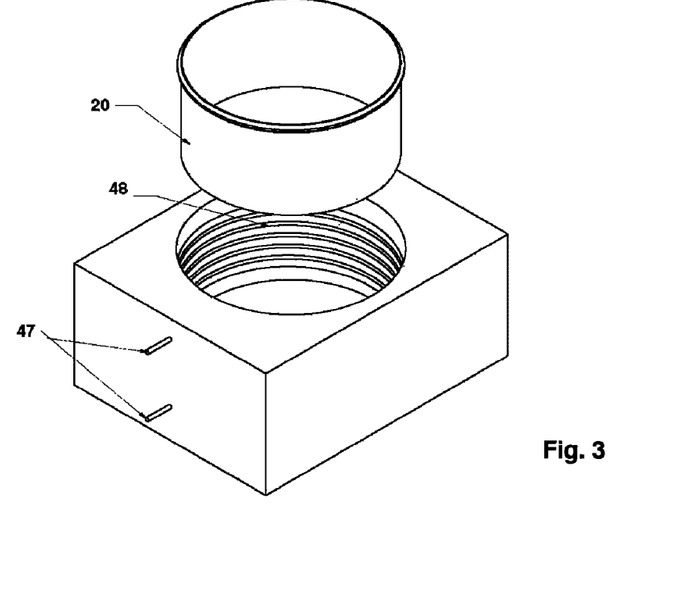
FIG. 3 is a perspective view a pyrolysis unit and heat source with an electric heater useful with pyrolysis system embodiments of the invention.

FIG. 3 shows another example of a heat source 40 for pyrolysis unit 100. In this example an electric heating system 48 is used, in which an electrical current is passed through conductors 47 to produce thermal energy in the walls of container 20 through induction.

Figure 4:
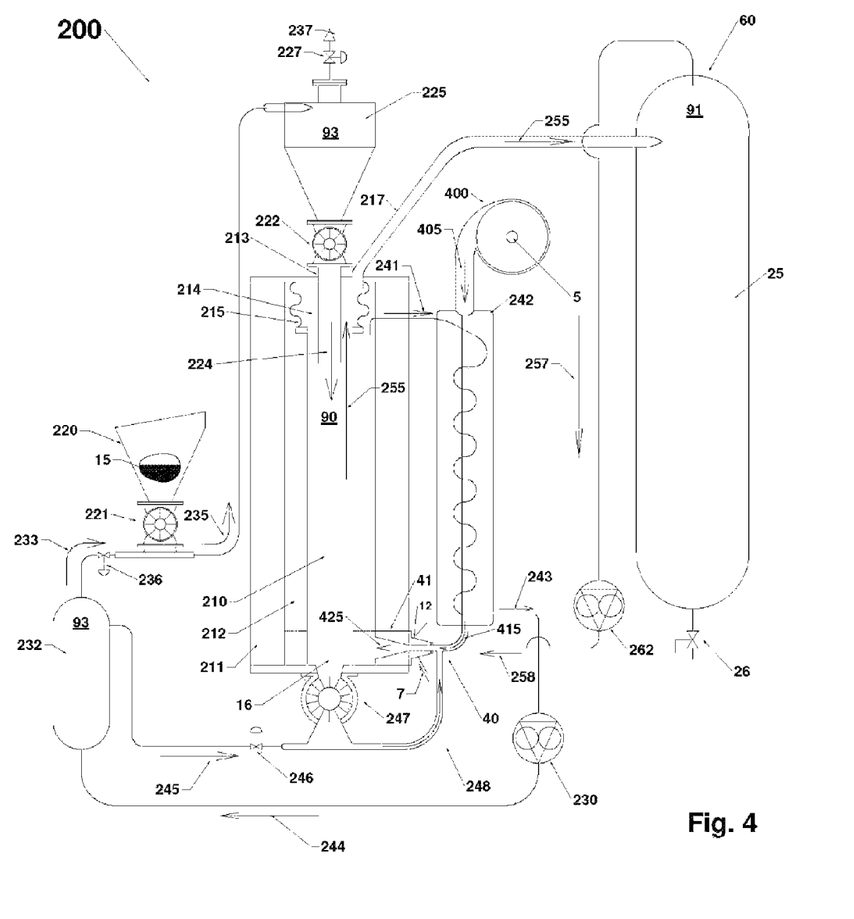
FIG. 4 is a schematic, partially in cross-section, of a second pyrolysis system in accordance with an embodiment of the invention.

Turning to FIG. 4, a continuous operable pyrolysis system in accordance with an embodiment of the invention is depicted as reference number 200. The pyrolysis system 200 includes a pyrolysis chamber 210, a heat source 40, and a liquid collection system 60. Other optional features are also shown and described in detail below.

With continued reference to FIG. 4, the biomass feed bin 220 accepts raw biomass 15. The present embodiment envisions receiving this biomass 15 primarily from sawmills, particularly CNS facilities. The biomass 15 will typically not need to be ground to a smaller size because it will already be of a size suitable for use in the system 200. If the biomass 15 does need to be ground, however, the biomass 15 will be ground prior to placing the biomass 15 in the biomass feed bin 220. Note that in the present embodiment, an optimal size for particles of biomass 15 used in the pyrolysis system 200 are envisioned to be particles having no side generally greater than one-quarter inch in length. In alternate embodiments, however, items of biomass 15 having substantially larger dimensions may be used. Note also that in the present embodiment, items of biomass 15 are envisioned to include wood chips, sawdust, bark, wood shavings, and the like. Note further that in alternate embodiments, the use of biomass 15 of varying types received from numerous different sources may be used. These can include environmentally problematic materials such as waste paper and ground tire rubber.

Still referring to FIG. 4, some biomass 15 fed into the system 200 might require drying prior to undergoing pyrolysis. Biomass 15 with a moisture content of approximately fifteen percent or less by weight can typically be subjected to pyrolysis without prior drying. Green biomass 15, however, will generally have a moisture content of about fifty percent by weight, as opposed to dry biomass 15 that generally will have a moisture content of about ten percent. The green biomass 15 can be blended with the drier biomass 15 to achieve a combined moisture content of fifteen percent or less. If such blending of the biomass 15 is insufficient to achieve a fifteen percent moisture content by weight, then the biomass 15 will need to be dried prior to subjecting the biomass 15 to pyrolysis. Optimally, the biomass 15 subjected to pyrolysis will have a moisture content of no more than twelve percent by weight. In some cases the biomass 15 may be too dry, in which case moisture can be added.

Continuing with FIG. 4, the pyrolysis system 200 includes a heat source 40 that includes a burner 41, a combustion chamber 212, and insulation cover 211 surrounding the combustion chamber 212. Combustion fan 400 draws air 5 delivering it to the inlet of economizer 242 as flow 405, (shown as an arrow). The air is heated as it flows through the economizer 242 and exits as flow 415 (shown as an arrow). The preheated air is mixed with fuel 7 and ignited by igniter 12 within the burner 41. The combustion gas flow 425 (shown as an arrow) passes through the combustion chamber 212 and exits as exhaust flow 241, (shown as an arrow). The exhaust flow 241 passes through the economizer 242 where it preheats the air flow 405, and exits the economizer as flow 243 (shown as an arrow). Blower 230 draws the flow 243 from the economizer 242 delivering it to entrainment gas storage tank 232 as flow 244 at pressure 93. Control valve 246 meters entrainment gas flow 245, (shown as an arrow) to rotary valve 247. Carbon 16, a product of the pyrolysis is delivered from the pyrolysis chamber 210 to the entraining gas flow 245 and is blown into the heat system 40 as entrained carbon flow 248 as fuel for combustion.

Flow control valve 236, meters entraining gas flow 233, (shown as an arrow), through rotary valve 221. Biomass 15 is metered from biomass bin 220 by rotary valve 221 and is entrained by flow 233 as flow 235. Cyclone 225 receives entrained biomass flow 235 and separates by cyclonic action the biomass from the entraining gas. The biomass is collected by the cyclone for delivery to the pyrolysis chamber 210 through rotary valve 222. The entraining gas exits the cyclone through valve 227 as flow 237. Control valve 227 controls the pressure 93 in the cyclone to enhance the flow of biomass into the pyrolysis chamber 210.

Biomass 15 is delivered from cyclone separator 225 by the rotary valve 222 to the pyrolysis chamber 210 through pyrolysis chamber inlet 213 as flow 224 (shown as an arrow) at the pyrolysis chamber pressure 90, where the biomass 15 begins to receive thermal energy. The pyrolysis chamber 210 acts as an open heat exchanger with the colder biomass 15 being heated by the high temperature pyrolysis vapors that are exiting the pyrolysis chamber 210 as flow 255.

Pyrolysis chamber 210 flex joint 215 allows the pyrolysis chamber walls to elongate during operation while maintaining a seal between the pyrolysis chamber 210 and the combustion chamber 212. This forms a closed loop heat exchanger between the pyrolysis chamber 210 and the combustion chamber 212 preventing oxygen remaining in the combustion process to enter the pyrolysis chamber 210.

The pyrolysis vapors and non condensing gases exit the pyrolysis chamber 210 as flow 255 through duct 217. The flow 255 enters the liquid collection system 60, where the liquid 17 is collected into container 25 by the liquid collection system 60.

Blower 262 draws the non condensing gas as flow 257 from the collection tank 25, delivering the non condensing gas as flow 258 as combustion fuel 7 to the heat source 40.

Figure 5:
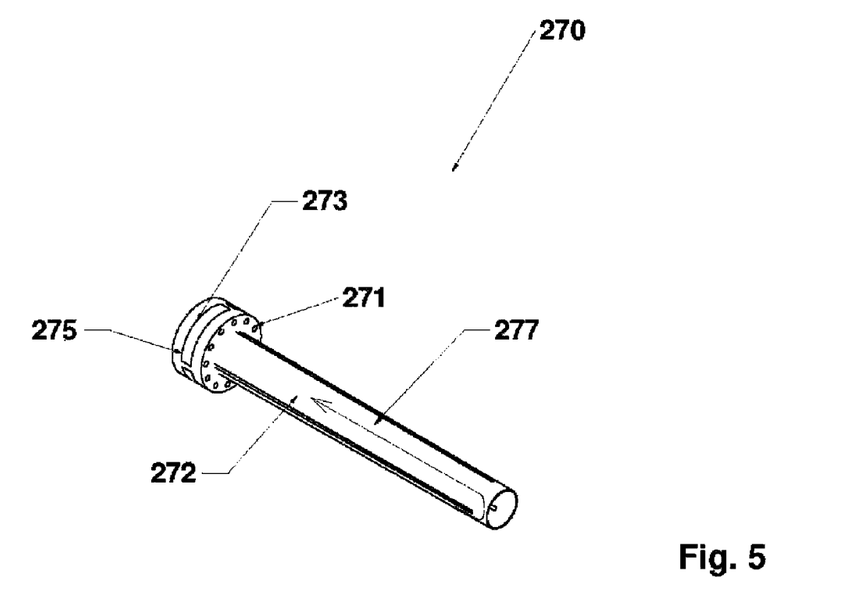
FIG. 5 is a perspective view of an electric pre-heater useful with the system of FIG. 4.

FIG. 5 depicts an optional electric pre heater 270 that is installed between the rotary valve 222 and the pyrolysis chamber 210 of pyrolysis system 200. The pre heater 270 has three resistive sections 272 that are maintained in electrical isolation by insulator 275 with flange pattern 271. The resistive sections 272 are heated by the flow of electrical energy 277 (shown as an arrow) thereby generating thermal energy to assist in the pre heating of the biomass flow 224.

Figure 6:
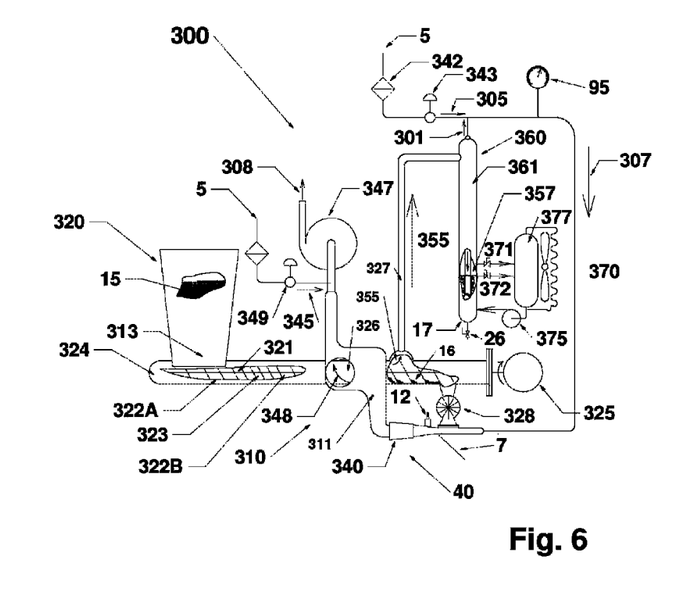
FIG. 6 is a schematic, partially in cross-section, of an auger based pyrolysis system in accordance with an embodiment of the invention.

Turning to FIG. 6, a continuous pyrolysis system in accordance with this invention is depicted as system 300 with a pyrolysis unit 310, described in detail below.

In this embodiment, a biomass feed bin 320 contains the biomass 15 to be pyrolized. The biomass 15 is delivered into the pyrolysis unit 310 from the feed bin 320 through a biomass input port 313 by a variable pitch auger 321 attached to the biomass feed bin 320. The biomass feed bin 320 is capable of continually feeding biomass 15 into the pyrolysis unit 310.

The pyrolysis unit 310 includes a variable pitch auger 321, an auger housing 324, an auger drive 325, a pyrolysis gas exit pipe 327, a combustion chamber 311, and a rotary valve 328.

The variable pitch auger 321 has a first coarse pitch section 322A that is proximate to the biomass input port 313, a second coarse pitch section 322B that is proximate to the pyrolysis zone 326 and a fine pitch section 323 that is between the coarse pitch sections 222A and 222B.

Biomass 15 is fed from the biomass bin 320 by the variable pitch auger 321 through the auger housing 324. The biomass 15 fills the first course section 322A of the variable pitch auger 321 and is increased in density as it moves by the auger motion through the fine section 323 of the variable pitch auger 321. The biomass 15 density increase provides a seal between the pyrolysis zone 326 and the biomass bin 320 preventing flow of the pyrolysis vapors and non condensing gas from the pyrolysis zone 326 through the auger housing 324 and the biomass bin 320. The variable pitch auger 321 increases to a second course pitch 322B allowing the biomass 15 density to decrease prior to entering the pyrolysis zone 326. The biomass 15 passes through the pyrolysis zone 326 where thermal energy from the combustion chamber 311, passes through the auger housing 324 causing the biomass 15 to undergo pyrolysis. The carbon 16 produced by the pyrolysis of the biomass 15 moves by the action of the variable pitch auger 321 to the rotary valve 328. The pyrolysis vapors and non condensing gases flow through the pyrolysis gas exit pipe 327 as flow 355 (shown as an arrow) to the condensing system 360.

The flow 355 bubbles through a quench fluid 357 where the pyrolysis vapors are condensed and collected as pyrolysis oil 17. The non condensing gas exits the quench chamber 361 as a draft flow 301 combining with combustion air flow 305 forming combustion air and non condensing gas flow 307. The combustion air 5 passes though a filter and is metered by a flow control valve 343 that controls the draft pressure 95 of the quench container 361.

Continuing with FIG. 6, the burner 340 receives combustion air and non condensing gas flow 307, and fuel 7 that are mixed and ignited by igniter 12. The combustion gas flow 348 passes through the combustion chamber 311 that surrounds the pyrolysis zone 326. The combustion gas flow 348 and cooling air flow 347 are drafted by induced draft blower 345 and exit the system as exhaust flow 308.

The quench fluid 357 level is maintained by selecting flow 371 or 372 and supply pump 375. A cooling system 377 provides closed loop cooling of the quench liquid. Pyrolysis oil 17 is removed from container 361 through valve 26.

Figure 7:
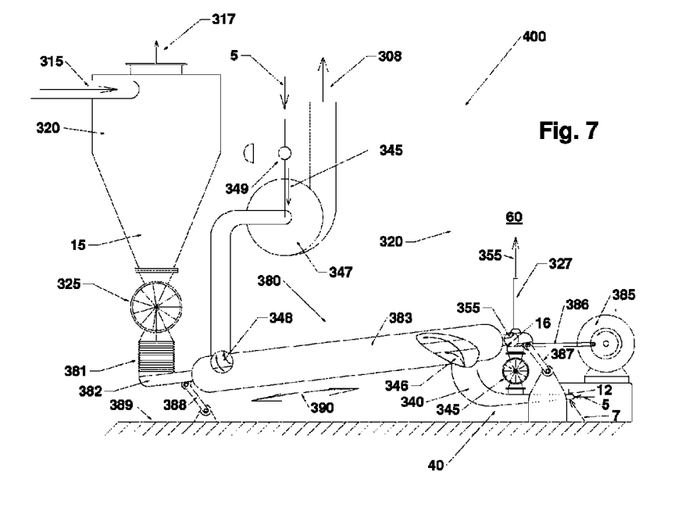
FIG. 7 is a schematic, partially in cross-section, of an inertia conveyor based pyrolysis system in accordance with an embodiment of the invention.

FIG. 7 is another embodiment of the system and method of a continuous pyrolysis system in accordance with this invention as pyrolysis system 400 with a pyrolysis unit 380, described in detail below.

The cyclone 320 receives biomass 15 as entrained flow 315; the biomass 15 is separated from the entraining gas by cyclonic action with the entraining gas exiting the cyclone 320 as flow 317. The biomass 15 is delivered into the pyrolysis unit 380 from the cyclone 320 by a rotary valve 325 that is coupled to the inertia conveyor 382 though flexible biomass input port 381. In this way, the cyclone 320 is able to continually feed biomass 15 into the pyrolysis unit 380.

The pyrolysis unit 380 includes an enclosed inclined inertia conveyor 382, an insulated combustion chamber 383, a foundation system 389, an inertia conveyor drive 385, a pyrolysis gas exit pipe 327, and a rotary valve 345.

Biomass 15 is fed from the cyclone 320 by the rotary valve 345 through the flexible biomass input port 381. The biomass 15 is moved through the inertia conveyor 382 by the oscillatory motion 390 induced by the action of the drive 385 and the parallel links 387 and 388 as constrained by foundation 389.

The inertia conveyor 382 is substantiality surrounded by the insulated combustion chamber 383. The inertia conveyor 382 is heated by the flow of combustion gas 346 received from the heat source 40. The biomass 15 passing through the inclined inertia conveyor 382 receives thermal energy from the inertia conveyor 382 and undergoes pyrolysis. The carbon 16 produced by the pyrolysis continues to move by the motion 390 of the inertia conveyor 382 to the rotary valve 345. The pyrolysis vapors and non condensing gas products of the pyrolysis of the biomass 15 exit the inertia conveyor 382 through the pyrolysis gas exit pipe 327 as flow 355 to the liquid collection system 60.

Heat source 40 includes a burner 41. Burner 41 receives combustion air 5 and fuel 7 which are ignited by igniter 12. Rotary valve 345 delivers carbon 16 from the inertia conveyor 382 to the burner 41 as a fuel for combustion. The combustion gas flows into the insulated combustion chamber 383 as flow 346 and exits as flow 348. Induction fan 347 draws the combustion gas flow 348 and cooling air flow 349 to form exhaust flow 308.

The invention has been described above with reference to preferred embodiments. Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the present invention, suitable methods and materials are described. However, the skilled should understand that the methods and materials used and described are examples and may not be the only ones suitable for use in the invention.

The invention has been described in some detail, but it will be apparent that various modifications and changes can be made within the spirit and scope of the invention as described in the foregoing specification and the appended claims.

That which is claimed is:

1. A process for pyrolyzing biomass, the process comprising:
   pyrolyzing biomass in a pyrolysis chamber by heating the biomass to a pyrolyzation temperature to generate a pyrolysis vapor flow therefrom;
   directing the pyrolysis vapor flow from the fast pyrolysis chamber along a vapor flow conduit to a condensation trap at a temperature sufficient to condense the vapor to liquid and generate a thermal gradient along the vapor flow conduit between the pyrolysis chamber and condensation trap;
   wherein, a majority of the pyrolysis vapor flow along the vapor flow conduit to the condensation trap is achieved by natural convection.

2. The process of claim 1, wherein the pyrolysis vapor flow is directed along the vapor flow conduit without mechanical means for forcing gas flow therethrough.

3. The process of claim 1, where the pyrolysis chamber is a fast pyrolysis chamber.

4. The process of claim 1, further comprising:
   combusting fuel to heat the biomass and produce combustion gas;
   directing the combustion gas through a combustion gas conduit to create a combustion gas flow; and
   providing biomass to the pyrolysis chamber by entraining the biomass in the combustion gas flow.

5. The process of claim 1, wherein the pyrolysis chamber is vertically oriented and elongated along a vertical axis thereof and a combustion chamber is arranged generally concentrically and thermally coupled with the pyrolysis chamber, the process further comprising feeding biomass into an upper end of the pyrolysis chamber and allowing it to fall toward a lower end of the pyrolysis chamber.

6. The process of claim 1, further comprising:
   introducing biomass into the pyrolysis chamber by feeding the biomass to a proximal end of an auger having a spiral blade positioned along its length between the proximal end and a distal end thereof; and
   moving the introduced biomass along the length of the auger through a pyrolysis zone in which pyrolysis occurs.

7. The process of claim 6, wherein a first section of the spiral blade has a coarse pitch and a second section of the spiral blade has a finer pitch, the coarse pitched section being positioned proximate to the proximal end of the auger, the finer pitched section being positioned at an entrance of the pyrolysis zone for allowing biomass travelling along the finer pitched section to seal the entrance of the pyrolysis zone to prevent pyrolysis vapors from exiting.

8. The process of claim 1, further comprising introducing biomass into the pyrolysis chamber by feeding the biomass to a proximal end of an inclined inertia conveyor and into the pyrolysis chamber, at least a portion of the inclined inertia conveyor being within the pyrolysis chamber.

\* \* \* \* \*